United States Patent
Cheong

(10) Patent No.: US 7,387,718 B2
(45) Date of Patent: Jun. 17, 2008

(54) CATIONIC ELECTRODEPOSITION COATING COMPOSITION AND METHOD OF PREPARING THE SAME

(75) Inventor: Hoon Cheong, Gyeonggi-do (KR)

(73) Assignee: DPI Co., Ltd., Anyang (KR)

(*) Notice: Subject to any disclaimer, the term of this patent is extended or adjusted under 35 U.S.C. 154(b) by 486 days.

(21) Appl. No.: 11/024,698

(22) Filed: Dec. 30, 2004

(65) Prior Publication Data

US 2005/0165134 A1    Jul. 28, 2005

(30) Foreign Application Priority Data

Dec. 30, 2003  (KR) .................... 10-2003-0100091

(51) Int. Cl.
*C25D 9/02* (2006.01)
*B05D 3/02* (2006.01)
*C08L 63/00* (2006.01)
*B32B 15/092* (2006.01)

(52) U.S. Cl. ..................... 205/323; 205/316; 205/317; 427/58; 427/386; 427/457; 523/402; 523/414; 523/415; 523/457

(58) Field of Classification Search ................ 205/316, 205/317, 323; 428/413, 414, 416, 418; 523/457, 523/458, 459, 460, 402, 414, 415; 525/107, 525/111, 523, 525, 528, 529, 530, 533; 427/58, 427/386, 457

See application file for complete search history.

(56) References Cited

U.S. PATENT DOCUMENTS

| 6,211,584 | B1 * | 4/2001 | Kurosawa et al. ............ 310/45 |
| 6,476,102 | B1 * | 11/2002 | Chung et al. ............... 523/409 |
| 6,551,482 | B2 * | 4/2003 | Yamamoto et al. ......... 204/488 |
| 7,070,683 | B2 * | 7/2006 | Peffer et al. ................ 204/500 |

FOREIGN PATENT DOCUMENTS

WO    WO 02/055577 A1 *   7/2002

* cited by examiner

*Primary Examiner*—Michael J Feely
(74) *Attorney, Agent, or Firm*—Lowe Hauptman Ham & Berner LLP

(57) ABSTRACT

In a cationic electrodeposition coating composition and a method of preparing the cationic electrodeposition coating composition, a cationic electrodeposition coating composition is prepared by dispersing a cationic electrodeposition resin in an aqueous medium containing about 0.5 to 3% by weight of zinc acetate. The cationic electrodeposition resin is prepared by reacting about 40 to about 60% by weight of a cationic resin prepared by an epoxy-amino addition reaction, about 2 to about 5% by weight of an acrylic cationic resin having an amino group, and about 30 to about 50% by weight of a polyisocyanate curing agent including partially blocked isocyanate functional groups. The cured film formed on the hard disc driver base frame by using the cationic electrodeposition coating composition contains no heavy metal such as lead or tin, has no appearance defect such as a pinhole and has excellent corrosion-resistance even when being cured at low temperature.

6 Claims, No Drawings

CATIONIC ELECTRODEPOSITION COATING COMPOSITION AND METHOD OF PREPARING THE SAME

CROSS-REFERENCE OF RELATED APPLICATIONS

The present application claims priority from Korean Patent Application No. 2003-100091, filed on Dec. 30, 2003, the disclosure of which is hereby incorporated by reference in its entirety.

BACKGROUND OF THE INVENTION

1. Field of the Invention

The present invention relates to a cationic electrodeposition coating composition and a method of preparing the cationic electrodeposition coating composition, and more particularly to a cationic electrodeposition coating composition coated on a base frame to form a film having improved characteristics, and a method of preparing the cationic electrodeposition coating composition.

2. Description of the Related Arts

A hard disc driver as one of secondary memory units of a computer writes data in a magnetic disc by a magnetic head or reads data stored in the magnetic disc. A base frame manufactured by a die-casting of an aluminum alloy is required to protect the hard disc driver. In order to protect the base frame, a continuous coating film is formed on the base frame by an electrodeposition coating method. Lead-free cationic epoxy electrodeposition paint had been applied to coat the base frame of the hard disc driver. In general, tin acts as a catalyst for promoting a curing reaction of the cationic epoxy electrodeposition paint. An electrodeposited film of paint coated by a tin-free cationic electrodepositing paint is cured at a high temperature of at least about 180° C. The base frame would be thermally deformed when being cured at the high temperature. The electrodeposited film of paint is dried at high temperature so that energy for forming the film is greatly increased. Also, a pinhole may be generated when the base frame of the hard disc diver is electrodeposition coated by the tin-free cationic epoxy electrodeposition paint. Therefore, the appearance of the base frame may be deteriorated, and the aluminum alloy may be exposed so the operation performance of the hard disc driver may be affected.

Also, the conventional cationic epoxy electrodeposition paint includes lead to improve corrosion-resistance of the film formed by the electrodeposition paint, and as a result, environment is polluted. Presently, the environmental pollutants such as lead and tin are restricted in use.

SUMMARY OF THE INVENTION

The present invention provides a low temperature curable cationic electrodeposition coating composition. The cationic electrodeposition coating composition in accordance with an aspect of the present invention reduces environmental pollution problems and does not have any defect of appearance caused by hydrogen gas.

The present invention also provides a method of preparing the cationic electrodeposition coating composition. A cationic electrodeposition coating composition in accordance with an aspect of the present invention is prepared by dispersing a cationic electrodeposition resin in an aqueous medium containing about 0.5 to 3% by weight of zinc acetate. The cationic electrodeposition resin is prepared by reacting (a) about 40 to about 60% by weight of a cationic resin prepared by an epoxy-amino addition reaction, (b) about 2 to about 5% by weight of an acrylic cationic resin having an amino group and (c) about 30 to about 50% by weight of a polyisocyanate curing agent including partially blocked isocyanate functional groups.

A method of preparing a cationic electrodeposition coating composition in accordance with another aspect of the present invention is provided as follows.

A polyisocyanate curing agent including partially blocked isocyanate functional groups is prepared.

A cationic electrodeposition resin is prepared from (a) about 40 to about 60% by weight of a cationic electrodeposition synthetic resin prepared by an epoxy-amino addition reaction, (b) about 2 to about 5% by weight of an acrylic cationic resin having an amino group and (c) about 30 to about 50% by weight of the polyisocyanate curing agent.

A resin dispersion of the cationic electrodeposition resin is prepared by dispersing the cationic electrodeposition resin in an aqueous medium containing about 0.5 to about 3% by weight of zinc acetate.

About 0.5 to about 3% by weight of ethylene glycol monohexyl ether is added to the resin dispersion of the cationic electrodeposition resin.

A film of a paint formed on a base frame of a hard disc driver by electrodeposition-coating the cationic electrodeposition coating composition in accordance with the present invention contains no heavy metals such as lead, tin and the like. In addition, defect of appearance on the film of paint such as a pinhole is not generated by hydrogen gas. The dried film of the paint also shows excellent corrosion-resistance when being cured at a low temperature.

DETAILED DESCRIPTION OF THE INVENTION

A method of preparing the cationic electrodeposition coating composition in accordance with the present invention will be described below in more detail.

A polyisocyanate curing agent including partially blocked isocyanate functional groups is prepared.

The partially blocked isocyanate functional groups in the polyisocyanate curing are dissociated from the polyisocyanate when the polyisocyanate is heated and cured. The dissociated isocyanate functional groups may be reacted with a hydroxyl functional group at a backbone of an amino group containing resin or an activated hydrogen of an amino group.

Examples of an isocyanate used for the polyisocyanate curing agent of the present invention may include toluene diisocyanate, isophorone diisocyanate, hexamethylene diisocyanate and biuret compound thereof, methylene diisocyanate monomer and oligomer thereof, polymeric methylenediisocyanate and noborane diisocyanate and the like. These can be used alone or in a combination thereof.

Examples of a blocking agent for blocking the isocyanate functional group may include diethyl malonate, methylethyl ketoxym, dimethyl pyrazole, ε-carporlactam, ether having hydroxyl functional groups, etc. These may be used alone or in a combination thereof. As an ether having hydroxyl functional groups, ethyleneglycol monobutylether, diethyleneglycol monobutyl ether and the like may be mentioned. The ethyleneglycol monobutylether improves appearance of electrodeposited film of paint. The diethyl malonate is required to be included as the blocking agent, but the storage stability of the polyisocyante curing agent is deteriorated when the diethyl malonate being used alone. Therefore, the blocked polyisocyante is prepared by reacting an isocyanate with a trimethylol propane to increase the molecular weight and to block the reaction resultant by the diethylmalonate with small amount of methylethyl ketoxym, dimethyl pyrazole, ε-carporlactam and ether having hydroxyl functional groups. The curing agent prepared as above has improved storage stability and excellent curability at a low temperature of no more than about 140° C.

The curing agent is prepared by reacting the isocyanate with the trimethylol propane in a molar ratio of about 3:1 and then blocks the isocyanate with the blocking agent including diethylmalonate and an auxiliary blocking agent in a molar ratio of about 8:2.

Examples of the auxiliary blocking agent may include methylethyl ketoxym, dimethyl pyrazole, ethyleneglycol monobutylether, diethyleneglycol monobutylether and the like. These may be used alone or in a combination thereof.

Also, the curing agent may include a mixture of a first curing agent and a second curing agent. The first curing agent comprises an aromatic polyisocyanate of a polymethylene polyphenylisocyanate. The second curing agent comprises a hexamethylene diisocyanate or an isophorone diisocyanate.

The aromatic polyisocyanate of the polymethylene polyphenylisocyanate is a mixture of a polymethylenepolyphenyl isocyanate and a diphenylmethyl-4,4-diisocyanate.

When the amount of the polyisocyanate curing agent including the partially blocked functional groups used is less than about 30% by weight, the curing property is deteriorated, thereby lowering mechanical properties such as pencil hardness and corrosion-resistance. In addition, when the amount of the polyisocyanate curing agent including the partially blocked functional groups exceeds about 50% by weight, the manufacturing an aqueous dispersion is difficult and the mechanical properties such as impact-resistance and flexible resistance are deteriorated. Therefore, the amount of the polyisocyanate curing agent including the partially blocked isocyanate functional groups used is preferably in the range of about 30 to about 50% by weight, and more preferably about 35 to about 45% by weight.

The cationic electrodeposition coating composition is prepared by using the cationic resin prepared by the epoxy-amino addition reaction. The cationic resin prepared by the epoxy-amino addition acts as a film forming resin in the electrodeposition coating composition. Some of these known film forming resins are described in U.S. Pat. Nos. 3,663,839; 3,984,299; 3,947,338; 3,947,339; and 6,130,274. The cationic resin prepared by the epoxy-amino addition reaction is an amino group containing resin prepared by the addition reaction of a polyepoxide with a primary, secondary or tertiary amine. The cationic resin prepared by the addition reaction of the polyepoxide with the amine is represented by the following structural formula (I):

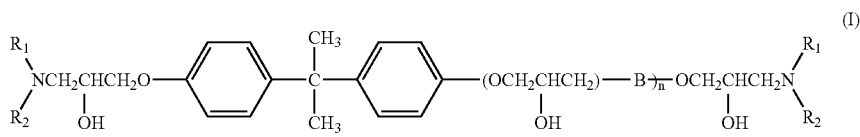

In the above formula (I), $R_1$, $R_2$ and B are as follows and n is an integer of 3 or 4.

| $R_1$ | $R_2$ | B |
|---|---|---|
| —$CH_3$ | —$(CH_2)_2OH$ | —[—$(CH_2)_5$—C(=O)—O—]—$(CH_2)_5$— |
| —$CH_2N=CCH_2CH(CH_3)_2$ with $CH_3$ | $R_2=R_1$ | phenyl-C($CH_3$)$_2$-phenyl |

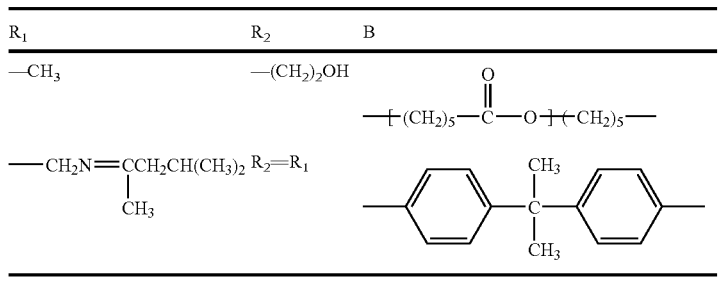

More particularly, the cationic resin prepared by the epoxy-amino addition reaction may include N-methyl ethanol amine, diketimine and the like. Preferably, the cationic resin prepared by the epoxy-amino addition reaction may include a mixture of the N-methyl ethanol amine and the diketimine. The diketimine is derived from diethylene triamine and methyl isobutyl ketone.

The addition reaction of the polyepoxide with the amine is represented by the following reaction scheme:

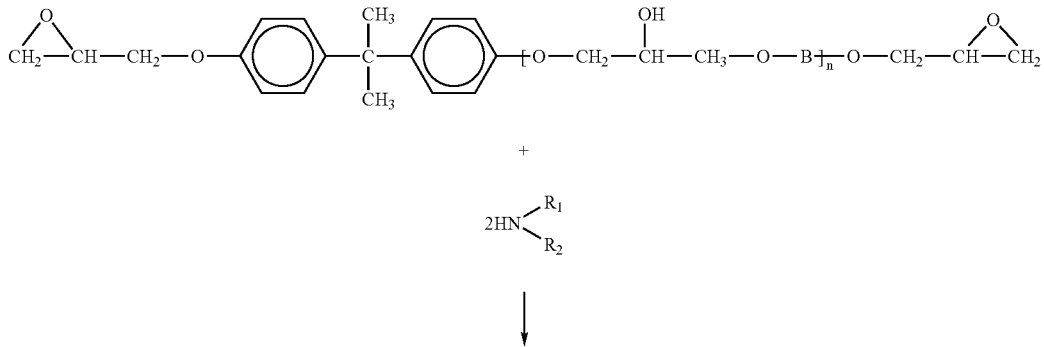

-continued

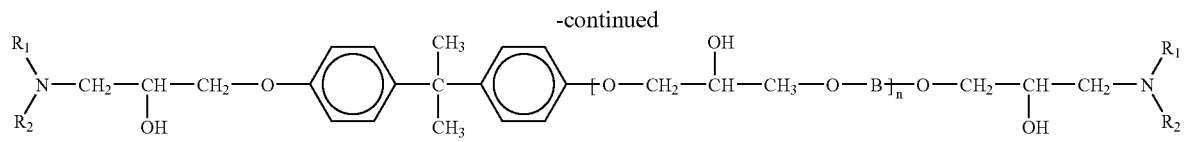

In the above reaction scheme, $R_1$, $R_2$, B and n are the same as defined in the above structural formula (I).

The cationic resin prepared by the epoxy-amino addition reaction is prepared by using an epoxy resin, a polycaprolactone diol, bisphenol A, benzyldimethyl amine and the like.

When the amount of the cationic resin prepared by the epoxy-amino addition reaction used is less than about 40% by weight, mechanical properties of the cationic electrodeposition coating composition are poor. In addition, when the amount of the cationic resin prepared by the epoxy-amino addition reaction used exceeds 60% by weight, the manufacturing an aqueous dispersion is difficult. Therefore, the amount of the cationic resin prepared by the epoxy-amino addition reaction used is preferably in the range of about 40 to about 60% by weight, and more preferably about 45 to about 55% by weight.

The cationic electrodeposition coating composition is prepared by using an acrylic cationic resin having an amino group. The acrylic cationic resin having the amino group is prepared by copolymerizing ethyleneglycol monobutylether, butyl acrylate, styrene, (N,N-dimethyl)aminoethyl methacrylate, 2-hydroxy ethyl acrylate, methyl methacrylate, benzoyl peroxide, t-butyl peroctoate and the like. These can be used alone or in a combination thereof.

When the amount of the acrylic cationic resin having the amino group used is less than about 2% by weight, a dried coated film having an epoxy-acrylic double-layered structure cannot be obtained. In addition, when the amount of the acrylic cationic resin having the amino group used exceeds about 5% by weight, the epoxy resin and acrylic resin are not compatible, thereby affecting the surface appearance and gloss. Therefore, the amount of the acrylic cationic resin having the amino group used is in the range of about 2 to about 5% by weight, and preferably about 2 to about 4% by weight.

About 35 to about 45% by weight of thus prepared cationic electrodeposition resin, about 0.5 to about 3% by weight of zinc acetate, about 55 to about 65% by weight of deionized water and about 0.5 to about 1.5% by weigh of a neutralizing agent, are mixed to prepare a cationic electrodeposition resin dispersion.

The zinc acetate improves corrosion-resistance of the dried coated film where the cationic electrodeposition coating composition is electrodeposition coated. When the amount of the zinc acetate used is less than 0.5% by weight, chemical properties such as corrosion-resistance of the dried coated film are deteriorated. In addition, when the amount of the zinc acetate used exceeds 3% by weight, the zinc acetate is dissociated into a zinc ion and two acetic acid molecules in an aqueous medium. The acetic molecules affect electrical properties of the electrodeposition coating composition when the cationic electrodeposition resin is dispersed in the aqueous medium.

The neutralizing agent used for dispersing the cationic electrodeposition resin in the aqueous medium may include formic acid, zinc acetate, lactic acid and phosphorous acid and the like. When the amount of the neutralizing agent used is less than 0.5% by weight, the hydration of the cationic electrodeposition resin is difficult. In addition, when the amount of the neutralizing agent used exceeds 1.5% by weight, the thickness of the electrodeposition coated film is hard to be secured and defect of appearance such as a pinhole is generated. Therefore, the amount of the neutralizing agent used is preferably in the range of about 0.5 to about 1.5% by weight.

The cationic electrodeposition coating composition is obtained by adding about 0.5 to about 3% by weight of ethyleneglycol monohexylether to the cationic electrodeposition resin dispersion.

The ethyleneglycol monohexylether maintains the driving performance of a hard disc driver by preventing the generation of pinholes due to generation of hydrogen gas when the cationic electrodeposition coating composition is electrodeposition coated.

When the amount of the ethyleneglycol monohexylether used is less than 0.5% by weight, the defect of the appearance such as a pinhole is generated by hydrogen gas. In addition, when the amount of the ethlyeneglycol monohexylether used exceeds 3% by weight, the thickness of the coated film becomes increased and throwing power is lowered due to low coating voltage. Therefore, the amount of the ethyleneglycol monohexylether used is preferably in the range of about 0.5 to about 3% by weight.

The cationic electrodeposition coating composition in accordance with the present invention is prepared by dispersing a cationic electrodeposition resin in an aqueous medium containing 0.5-3% by weight of zinc acetate. The cationic electrodeposition resin is prepared by reacting about 40 to about 60% by weight of the cationic resin prepared by the epoxy-amino addition reaction, about 2 to about 5% by weight of the acrylic cationic resin having the amino group and about 30 to about 50% by weight of the polyisocyanate curing agent including the partially blocked isocyanate functional groups.

A pigment paste composition applied to the present invention may include a pigment grinding vehicle, pigment ingredients such as carbon black, titanium oxide and the like and a bismuth compound for improving corrosion-resistance.

Hereinafter, the present invention will be explained in more detail referring to the preferred embodiments. However, the present invention is not limited to the following embodiments.

EXAMPLE 1

1-(a) Preparation of an Acrylic Cationic Resin Having an Amino Group 385 grams of ethylene glycol monobutyl ether was introduced into a flask and held under nitrogen atmosphere at a temperature of 110° C. Then, a mixture of 62 grams of butyl acrylate, 293 grams of styrene, 59 grams of (N, N-dimethyl) aminoethyl methacrylate, 118 grams of 2-hydroxyethyl acrylate, 59 grams of methyl methacrylate and 20 grams of benzoyl peroxide at a temperature of 115° C., was dropped over four hours. Also, a mixture of 13 grams of t-butyl perocotate and 38 grams of ethyleneglycol monobutylether was dropwisely added to the resultant through a funnel over an hour. After the addition, the resultant mixture was held for three hours to obtain an acrylic cationic resin having an amino group whose amine value was 30-40 and solid content was 60. The ingredients of the acrylic cationic resin having the amino group and each content of the ingredients are shown in the following table 1.

TABLE 1

| Ingredients | Content (grams) |
|---|---|
| ethylene glycol monobutyl ether | 385 |
| butyl acrylate | 62 |
| styrene | 293 |
| (N,N-dimethyl)aminoethyl methacrylate | 59 |
| 2-hydroxyethyl acrylate | 118 |
| methyl methacrylate | 59 |
| benzoyl peroxide | 20 |
| t-butyl perocotate | 13 |

1-(b) Preparation of a First Curing Agent

A mixture containing a polymethylenepolyphenyl isocyanate and a diphenylmethyl-4,4-diisocyanate (Polymeric MDI (PAPI-135K), commercially available from HD POLYURETHANE Co., Ltd in Korea) was reacted with a trimethylol propane in a molar ratio of 3:1. Isocyanate functional groups were then blocked with ε-caprolactam to prepare a first curing agent.

1-(c) Preparation of a Second Curing Agent

An isophorone diisocyanate (commercially available from DEGUSA Co., Ltd.) was reacted with a trimethylol propane in a molar ratio of 3:1. Isocyanate functional groups were then blocked with a mixture of diethylmalonate and diethyleneglycol monobutylether in a molar ratio of 8:2 to prepare a second curing agent.

1-(d) Preparation of a Cationic Electrodeposition Coating Composition 27.1 grams of EPIKOTE 828CD, 9.7 grams of PLACCEL 205, 7.9 grams of bisphenol A and 2.4 grams of methyl isobutyl ketone were introduced into a reactor. The mixture was then heated to a temperature of 140° C. under nitrogen atmosphere. Then, 0.04 grams of benzyl dimethyl amine was added to the reaction mixture that was heated to a temperature of 180° C. and was reacted at a reflux temperature for about thirty minutes to remove water. The resultant mixture was cooled to a temperature of 160° C. and held in that state for one and half hours. Then, the resulting mixture was cooled to a temperature of 145° C. and 0.11 grams of benzyl dimethyl amine was added to the resulting product that was reacted at a temperature of 145° C. for approximately two and half hours to prepare a synthetic resin having an epoxy equivalent weight of 1,500. To the synthetic resin, 3.0 grams of diketimine (73% of solid content in methyl isobutyl ketone) derived from diethylene triamine and methyl isobutyl ketone and 2.6 grams of N-methyl ethanol amine were added at a temperature 100-110° C., that was held at a temperature of 125° C. for an hour. Next, 9.0 grams of the acrylic cationic resin having the amino group obtained from Example 1(a), 20.2 grams of the first curing agent obtained from Example 1-(b), 20.2 grams of the second curing agent obtained from Example 1-(c) and 1.2 grams of Surfynol were sequentially added to the resultant solution to prepare a cationic electrodeposition coating composition. The ingredients of the electrodeposition coating composition and each content of the ingredients are shown in the following table 2.

TABLE 2

| Ingredients | Content (grams) |
|---|---|
| EPIKOTE 828CD*[1] | 27.1 |
| PLACCEL 205*[2] | 9.7 |
| bisphenol A | 7.9 |
| methyl isobutyl ketone | 2.4 |
| benzyl dimethyl amine | 0.15 |
| diketimine | 3.0 |
| N-methylethanol amine | 2.6 |
| Acrylic cationic resin having an amino group (EXAMPLE 1-(a)) | 9.0 |
| First curing agent (Example 1-(b)) | 20.2 |
| Second curing agent (Example 1-(c)) | 20.2 |
| Surfynol 104*[3] | 0.2 |

*[1] EPIKOTE 828CD is an epoxy resin manufactured by the reaction of epichlorohydrin and bisphenol A that is commercially available from Kumho P&B Co., Ltd. in Korea. The epoxy equivalent weight thereof was approximately 188.
*[2] PLACCEL 205 is a polycaprolactondiol that is commercially available from DICEL Corp. in Japan.
*[3] Surfynol 104 is an antifoaming agent that is commercially available from Air Product Company.

1-(e) Preparation of an Aqueous Dispersion of the Cationic Electrodeposition Resin 58.82 grams of deionized water, 0.9 grams of 90% lactic acid and 1.2 grams of zinc acetate were successively introduced into a reactor and homogenized. Then, 39.08 grams of cationic electrodeposition resin was slowly added and was stirred at high speed to be dispersed into water. Meanwhile, a solvent stripping process was performed at a temperature of 60° C. and under reduced pressure of approximately 60 mmHg to remove organic solvents having low boiling point. Then, the water-dispersed resin was filtered through diatomaceous earth in such a manner that a water-dispersed solution of the cationic electrodeposition resin was obtained. The solid content of the obtained resin was 39.8% and the average particle size of the resin was not more than 90 nm.

The ingredients of the aqueous dispersion of the cationic electrodeposition resin and each content of the ingredients are shown in the following table 3.

TABLE 3

| Ingredients | Content (grams) |
|---|---|
| Cationic electrodeposition coating resin (Example 1(d)) | 39.08 |
| 90% lactic acid | 0.9 |
| zinc acetate | 1.2 |
| deionized water | 58.82 |

1-(f) Preparation of a Cationic Electrodeposition Coating Composition

A mixture solution of 8.55 grams of deionized water and 1.0 grams of ethyleneglycol monohexylether was slowly added to 90.45 grams of the aqueous dispersion of the cationic electrodeposition resin with stirring to prepare a cationic electrodeposition coating composition.

The ingredients of the cationic electrodeposition coating composition and each content of the ingredients are shown in the following table 4.

TABLE 4

| Ingredients | Content (grams) |
|---|---|
| Aqueous dispersion of the cationic electrodeposition resin (Example 1-(e)) | 90.45 |

TABLE 4-continued

| Ingredients | Content (grams) |
|---|---|
| Ehtyleneglycol monohexylether | 1.0 |
| deionized water | 8.55 |

1-(g) Preparation of a Pigment Grinding Vehicle

A pigment grinding vehicle was prepared by reacting polyglycidyl ether of bisphenol A, a partially blocked isocyanate curing agent and organic tertiary aminate.

The ingredients of the pigment grinding vehicle and each content of the ingredients are shown in the following table 5.

TABLE 5

| Ingredients | Parts by weight |
|---|---|
| EPIKOTE 3004CD*[1] | 29.0 |
| propylene glycol monomethyl ether acetate | 10.0 |
| partially blocked isocyanate curing agent*[2] | 12.0 |
| ethylene glycol monobutyl ether | 33.0 |
| organic tertiary aminate*[3] | 14.0 |
| deionized water | 2.0 |

*[1]Polyglycidyl ether of bisphenol A (epoxy equivalent 900-1200), that is commercially available from Kumho P&B Co., Ltd. in Korea, was used.
*[2]The partially blocked isocyanate curing agent used was prepared by reacting 54.3 grams of 2,4-tolueneisocyanate and 40.7 grams of 2-ethyl hexanol at not more than 40° C. for three hours, adding 5.0 grams of methyl isobutyl ketone and diluting.
*[3]The organic tertiary aminate used was manufactured as follows. 15.5 grams of dimethyl ethanol amine and 56.7 grams of a partially blocked isocyanate curing agent were reacted at room temperature for two hours. The NCO peak was disappeared at 80° C. Then, 17.4 grams of lactic acid (purity 88%), 3.5 grams of deionized water and 7.0 grams of ethylene glycol monobutyl ether were added and reacted at a temperature of 60° C. for an hour to obtain the organic tertiary aminate.

29.0 grams of EPIKOTE 3004CD and 10.0 grams of propylene glycol monomethyl ether acetate were added to a reactor and heated to 110-120° C. to melt homogeneously. To the resulting product was added 12.0 grams of a partially blocked isocyanate curing agent, and the resulting product was held for an hour. Next, 33.0 grams of ethylene glycol monobutyl ether was added to the resulting product that was heated to a temperature of 80-90° C. Thereafter, 14.0 grams of organic tertiary aminate and 2.0 grams of deionized water were added to the resulting product, that was held until the acid value became approximately 0.8 so the pigment grinding vehicle was obtained. At this time, the epoxy equivalent weight of the polyglycidyl ether of bisphenol A was 900-1200.

1-(h) Preparation of a Pigment Paste Composition

A mixture of 0.6 grams of carbon black, 23.75 grams of titanium dioxide, 4.51 grams of bismuth trioxide, 45 grams of ion exchanged water, 16.77 grams of aluminum silicate and 25 grams of pigment grinding vehicle was ground in a bead mill to have a particle size of not more than 15 μm, thereby obtaining a dispersed product of a pigment paste composition. 110 grams of thus obtained dispersed product of the pigment paste composition, 403 grams of the aqueous dispersion of the cationic electrodeposition resin and 392 grams of deionized water were homogeneously stirred to obtain a diluted product of a cationic electrodeposition coating composition.

The solid content of the pigment paste composition was 50% and the ratio of the solid content of pigment/pigment grinding vehicle was 1/0.27.

Experiment

Electrodeposition Coating the Obtained Cationic Electrodeposition Coating Composition 449 grams of the cationic electrodeposition coating composition obtained from Example 1, 87 grams of the pigment paste composition and 464 grams of ion exchanged water were mixed to prepare an aqueous solution of the electrodeposition paint. After stirring the aqueous solution of the electrodeposition paint for 3 days, a base frame of a hard disc driver was coated by the electrodeposition paint with a direct voltage of 150V for 3 minutes and dried at a temperature of 140° C. for 20 minutes. The dried coated film showed good appearance and corrosion-resistance performance.

COMPARATIVE EXAMPLE 1

The same process as that of Example 1 was repeated, except that zinc acetate was not added in Example 1-(e) for preparing the aqueous dispersion of the cationic electrodeposition coating composition, 4.51 grams of lead silicate was added instead of bismuth trioxide in Example 1-(h) for preparing the pigment paste composition, ethyleneglycol monohexylether was not added in Example 1-(f) for preparing the cationic electrodeposition coating composition and a dried coated film prepared by using the cationic electrodeposition coating composition was cured at a temperature of 140° C. for 20 minutes.

COMPARATIVE EXAMPLE 2

The same process as that of Example 1 was repeated, except that zinc acetate was not added in Example 1-(e) for preparing the aqueous dispersion of the cationic electrodeposition coating composition, 4.51 grams of lead silicate was added instead of bismuth trioxide in Example 1-(h) for preparing the pigment paste composition, ethyleneglycol monohexylether was not added in Example 1-(f) for preparing the cationic electrodeposition coating composition a dried coated film prepared by using the cationic electrodeposition coating composition was cured at 180° C. for 20 minutes.

COMPARATIVE EXAMPLE 3

The same process as that of Example 1 was repeated, except that ethyleneglycol monohexylether was not added in Example 1-(f) for preparing the cationic electrodeposition coating composition.

COMPARATIVE EXAMPLE 4

The same process as that of Example 1 was repeated, except that ethyleneglycol monobutylether was used instead of using diethylmalonate and ethyleneglycolmonobutylether as an isocyanate blocking agent in Example 1-(c) for preparing the second curing agent.

By using the electrodeposition coating compositions obtained from Example 1 and Comparative Examples 1 and 4, an electrodeposition coating was performed at a temperature of 28° C. and at a voltage of 150V for three minutes. The properties of the obtained film having the thickness of 20 μm were examined. The testing results on the film are shown in Table 6.

TABLE 6

|  | Example 1 | Comparative Example 1 | Comparative Example 2 | Comparative Example 3 | Comparative Example 4 |
|---|---|---|---|---|---|
| Appearance | ⊙ | Pinhole generated | Pinhole generated | Pinhole generated | ⊙ |
| Baking temperature | 140° C. | 140° C. | 180° C. | 140° C. | 140° C. |
| Gloss(60° glossmeter) | 62 | 73 | 65 | 62 | 80 |
| Pencil hardness (Mitsubishiuni) | 2 H | B | H | 2 H | HB |
| Solvent-resistance | 20 times | 5 times | 15 times | 20 times | 7 times |
| Impact-resistance*2 (½" 500 g × 50 cm) | ○ | Film peeled-off | ⊙ | ⊙ | Film peeled-off |
| Flexible-resistance*3 (Mandrel Conical) | ○ | Film peeled-off | ⊙ | ⊙ | Film peeled-off |
| Corrosion-resistance*4 | 0.5 mm | X | 2 mm | 0.5 mm | X |
| Water-resistance*5 | No swelling of the film | X | No swelling of the film | No swelling of the film | X |

*Note:
⊙; excellent,
○; good,
Δ; common,
X; bad
*1 solvent-resistance: With reciprocating rubbing the film with methyl isobutyl ketone solvent, the number of reciprocation times of the methyl isobutyl ketone solvent was observed when the film began to be dissolved therein.
*2 impact-resistance: The test was executed five times by means of an impact-resistance tester manufactured from Dupont Co. wherein a coating layer that was not destroyed more than four times was regarded as good.
*3 flexible-resistance: The test was executed five times by means of a Mandrel Conical flexible-resistance tester wherein a coating layer that did not crack for more than four times was regarded as good.
*4 Corrosion-resistance: After spraying 5% NaCl solution at 35° C. over a thousand hours and allowing it to stand for twenty-four hours, a taping test was performed to examine.
*5 water-resistance: After immersing the film in hot-water of a temperature of 50° C. for two-hundred forty hours, the external appearance of the coating layer was observed.

As shown in Table 6, the dried coating film formed by using the cationic electrodeposition resin composition containing zinc acetate and ethyleneglycol monohexylether has excellent appearance, chemical-resistance such as corrosion-resistance and solvent-resistance and mechanical properties even when being cured at low temperature of 140° C. Meanwhile the dried coated film by using the cationic electrodeposition coating composition of Comparative Example 1 without employing the zinc acetate and the ethyleneglycol monohexylether, has inferior chemical properties and mechanical properties when being cured at low temperature of 140° C. The dried coated film by using the cationic electrodeposition coating composition of Comparative Example 2 has a pinhole in the appearance. Also, the dried coated film by using the cationic electrodeposition coating composition of Comparative Example 3 without employing the ethyleneglycol monohexylether, has excellent chemical-resistance and mechanical properties, but has a pinhole in the appearance. Also, the dried coated film by using the cationic electrodeposition coating composition of Comparative Example 4 without employing the diethylmalonate as the blocking agent for the blocked polyisocyanate has inferior low-temperature curability at 140° C.

As described above, a cationic electrodeposition coating composition for coating a base frame of a hard disc driver in accordance with the present invention includes zinc acetate capable of improving the corrosion-resistance and a blocking agent of a diethylmalonate of polyisocyanate blocked at low temperature of 140° C. The blocking agent of the diethylmalonate is dissociated from the blocked polyisocyanate and cured with isocyanate functional groups and activated hydrogen of an amino group of the main chain, thereby improving the chemical-resistance and mechanical properties. The base frame of the hard disc driver electrodeposition-coated by the cationic electrodeposition coating composition has excellent corrosion resistance, even when being cured at low temperature of 140° C. The ethyleneglycol monohexylether contained in the cationic electrodeposition coating composition may prevent defect of appearance such as a pinhole, which is caused by a hydrogen gas generated while electrodeposition-coating.

While the present invention is described in detail referring to the attached embodiments, various modifications, alternate constructions and equivalents may be employed without departing from the true spirit and scope of the present invention.

What is claimed is:

1. A method of preparing a cationic electrodeposition coating composition, the method comprising:
   preparing a polyisocyanate curing agent including partially blocked isocyanate functional groups, wherein the polyisocyanate curing agent is prepared by reacting an isocyanate with a trimethylol propane in a molar ratio of about 3:1 and blocking the isocyanate with a blocking agent including diethylmalonate and an auxiliary blocking agent in a molar ratio of about 8:2;

preparing a cationic electrodeposition resin by reacting (a) about 40 to about 60% by weight of a cationic electrodeposition synthetic resin prepared by an epoxy-amino addition reaction, (b) about 2 to about 5% by weight of an acrylic cationic resin having an amino group and (c) about 30 to about 50% by weight of the curing agent;

preparing an aqueous dispersion of the cationic electrodeposition resin by dispersing the cationic electrodeposition resin in an aqueous medium containing about 0.5 to about 3% by weight of zinc acetate; and adding about 0.5 to about 3% by weight of ethylene glycol monohexyl ether to the aqueous dispersion of the cationic electrodeposition resin.

2. The method of claim 1, wherein the auxiliary blocking agent comprises at least one selected from the group consisting of methyl ethyl ketoxym, dimethyl pyrazole, ethylene glycol monobutylether and diethylene glycol monobutylether.

3. A cationic electrodeposition coating composition prepared by dispersing a cationic electrodeposition resin in an aqueous medium containing about 0.5 to about 3% by weight of zinc acetate, the cationic electrodeposition resin being prepared by reacting about 40 to about 60% by weight of a cationic resin prepared by an epoxy-amino addition reaction, about 2 to about 5% by weight of an acrylic cationic resin having an amino group and about 30 to about 50% by weight of a polyisocyanate curing agent including partially blocked isocyanate functional groups, wherein the polyisocyanate curing agent is prepared by reacting an isocyanate with a trimethylol propane in a molar ratio of about 3:1 and blocking the isocyanate with a blocking agent including diethylmalonate and an auxiliary blocking agent in a molar ratio of about 8:2.

4. A method of preparing a dried coated film on an object by using a cationic electrodeposition coating composition, the method comprising:

preparing the cationic electrodeposition coating composition by dispersing a cationic electrodeposition resin in an aqueous medium containing about 0.5 to about 3% by weight of zinc acetate, the cationic electrodeposition resin being prepared by reacting about 40 to about 60% by weight of a cationic resin prepared by an epoxy-amino addition reaction, about 2 to about 5% by weight of an acrylic cationic resin having an amino group and about 30 to about 50% by weight of a polyisocyanate curing agent including partially blocked isocyanate functional groups, wherein the polyisocyanate curing agent is prepared by reacting an isocyanate with a trimethylol propane in a molar ratio of about 3:1 and blocking the isocyanate with a blocking agent including diethylmalonate and an auxiliary blocking agent in a molar ratio of about 8:2;

electrodeposition-coating the object with the electrodeposition coating composition; and curing the coated film at a temperature of about 120 to about 160° C.

5. The method of claim 4, wherein the object is a base frame of a hard disc driver.

6. The method of claim 5, wherein the base frame comprises an aluminum alloy and the base frame is manufactured by a die casting method.

* * * * *